US012728386B1

(12) United States Patent
Lambert et al.

(10) Patent No.: US 12,728,386 B1
(45) Date of Patent: Sep. 8, 2026

(54) SEMI-CLOSED CYCLE CHILLING OPTIMIZATION FOR CARBON CAPTURE SYSTEM

(71) Applicant: Enhanced Energy Group LLC., West Kingston, RI (US)

(72) Inventors: Garett Paul Lambert, Houston, TX (US); Barry Drake Lawson, Houston, TX (US); Paul M. Dunn, West Kingston, RI (US); Behnam Fakhari Kisomi, Houston, TX (US); MacIntyre Frederick, San Diego, CA (US)

(73) Assignee: Enhanced Energy Group LLC, West Kingston, RI (US)

( * ) Notice: Subject to any disclaimer, the term of this patent is extended or adjusted under 35 U.S.C. 154(b) by 0 days.

(21) Appl. No.: 19/073,283

(22) Filed: Mar. 7, 2025

(51) Int. Cl.
*B01D 53/62* (2006.01)
*B01D 53/00* (2006.01)
*B01D 53/92* (2006.01)
*F02C 3/34* (2006.01)

(52) U.S. Cl.
CPC ........... *B01D 53/62* (2013.01); *B01D 53/002* (2013.01); *B01D 53/92* (2013.01); *F02C 3/34* (2013.01); *B01D 2257/504* (2013.01); *B01D 2257/80* (2013.01); *B01D 2258/01* (2013.01)

(58) Field of Classification Search
CPC ...... B01D 53/62; B01D 53/002; B01D 53/92; B01D 2257/504; B01D 2257/80; B01D 2258/01; F02C 3/34; F02C 7/185; F01D 25/12; F01N 2240/02; F01N 2240/22; F01N 2270/02
See application file for complete search history.

(56) References Cited

U.S. PATENT DOCUMENTS 7,928,828 B2 4/2011 Kahr
8,268,050 B2 9/2012 Ha
9,021,810 B2 5/2015 Liu et al.
10,385,779 B2 * 8/2019 Kippel .................... F01D 25/12
11,111,847 B2 9/2021 Dunn
11,931,685 B2 3/2024 Dunn
12,129,818 B1 10/2024 Dunn et al.
12,172,124 B2 * 12/2024 Noborisato ........ B01D 53/1425
(Continued)

FOREIGN PATENT DOCUMENTS

CN 102985665 A * 3/2013 ............. F02C 1/007
IN 201821006612 A 3/2018
(Continued)

*Primary Examiner* — Craig Kim

(57) ABSTRACT

An exhaust system with a semi-closed cycle includes a main flow path having an inlet node, an outlet node, and a recirculation node; an exhaust gas recirculation flow path that diverts a recirculated exhaust gas from the recirculation node, and recirculates the recirculated exhaust gas to the inlet node; an engine configured to produce an exhaust gas based on a mixture of ambient air and the recirculated exhaust gas; a heat exchanger that transfers heat from a first portion of the exhaust stream to an exchanger fluid, resulting in the exchanger fluid being heated and the first portion of the exhaust stream being cooled to produce a first portion of a cooled exhaust stream; and an absorption chiller that extracts heat from a second portion of the exhaust stream to cool the second portion of the exhaust stream and produce a second portion of the cooled exhaust stream.

20 Claims, 6 Drawing Sheets

(56) References Cited

U.S. PATENT DOCUMENTS

| | | | | |
|---|---|---|---|---|
| 12,253,004 | B1 * | 3/2025 | Sgambati | F01K 23/10 |
| 12,331,068 | B2 * | 6/2025 | Wang | A61K 31/675 |
| 2009/0284013 | A1 * | 11/2009 | Anand | F02C 3/34 60/39.83 |
| 2014/0020398 | A1 * | 1/2014 | Mittricker | F02C 7/141 60/39.52 |
| 2014/0250911 | A1 * | 9/2014 | Huntington | F25J 1/025 60/39.5 |
| 2014/0374109 | A1 * | 12/2014 | Denton | F02C 7/18 166/309 |
| 2015/0152791 | A1 * | 6/2015 | White | F23N 5/003 700/282 |
| 2017/0350320 | A1 * | 12/2017 | Kippel | F01D 25/12 |
| 2018/0051660 | A1 * | 2/2018 | Marsh | F28D 7/1623 |
| 2019/0143261 | A1 | 5/2019 | Mabrouk et al. | |
| 2023/0134621 | A1 | 5/2023 | Baxter et al. | |

FOREIGN PATENT DOCUMENTS

| | | | | |
|---|---|---|---|---|
| KR | 20200043524 A * | 4/2020 | | B01D 53/047 |
| WO | WO-2011110554 A1 * | 9/2011 | | F01K 23/10 |
| WO | WO-2024172924 A2 * | 8/2024 | | F02C 7/143 |

* cited by examiner

SEMI-CLOSED CYCLE CHILLING OPTIMIZATION FOR CARBON CAPTURE SYSTEM

TECHNICAL FIELD

The present disclosure relates generally to an exhaust system with a semi-closed cycle with chilling optimization.

BACKGROUND

Engine exhaust emissions of methane ($CH_4$) and carbon dioxide ($CO_2$) have a substantial role in contributing to greenhouse gases in the atmosphere and to climate change. Exhaust systems for engine operation can be related to fuel processing (pyrolysis), exhaust $CO_2$ concentration management (e.g., for purposes of carbon capture), and/or carbon capture for collecting $CO_2$ in an exhaust stream. The exhaust systems may have an ability to operate an engine, such as a piston engine or a gas turbine engine, on an artificial atmosphere, created by a combination of air, cooled exhaust gas recirculation, and optionally oxygen injection (e.g., air enrichment or augmentation), to increase raw $CO_2$ levels in an engine exhaust. A technique of cooled exhaust recirculation, with or without oxygen augmentation, may be referred to as a semi-closed cycle (SCC). The SCC may be used to increase a $CO_2$ concentration for a carbon capture system.

Several benefits may be realized by increasing a $CO_2$ concentration of a recirculated exhaust gas and/or decreasing a temperature of the recirculated exhaust gas. However, it may be difficult in current carbon capture systems to increase the $CO_2$ concentration of the recirculated exhaust gas and/or decrease the temperature of the recirculated exhaust gas beyond current limitations. Moreover, moisture content within the recirculated exhaust gas may cause performance issues within the exhaust system, including leading to an increased risk of icing at the engine in colder ambient temperatures.

The exhaust systems of the present disclosure solve one or more of the problems set forth above and/or other problems in the field.

SUMMARY

An exhaust system with a semi-closed cycle may include a main flow path configured to carry one or more gases, wherein the main flow path has an inlet node, an outlet node, and a recirculation node arranged between the inlet node and the outlet node; an exhaust gas recirculation (EGR) flow path coupled to the main flow path and configured to divert, at the recirculation node, a recirculated exhaust gas from the main flow path and recirculate the recirculated exhaust gas to the inlet node; an engine arranged on the main flow path downstream from the inlet node, wherein the engine is configured to receive a gas mixture including ambient air and the recirculated exhaust gas, produce an exhaust gas, and output the exhaust gas and the recirculated exhaust gas in an exhaust stream; a heat exchanger configured to receive a first portion of the exhaust stream, and transfer heat from the first portion of the exhaust stream to an exchanger fluid, resulting in the exchanger fluid being heated and the first portion of the exhaust stream being cooled to produce a first portion of a cooled exhaust stream; and an absorption chiller configured to receive a second portion of the exhaust stream, extract heat from the second portion of the exhaust stream to cool the second portion of the exhaust stream and produce a second portion of the cooled exhaust stream, wherein an output of the heat exchanger and an output of the absorption chiller are coupled such that the first portion of the cooled exhaust stream and the second portion of the cooled exhaust stream are combined to produce the cooled exhaust stream, wherein the cooled exhaust stream is directed further along the main flow path toward the recirculation node and the outlet node.

An exhaust system with a semi-closed cycle may include a main flow path configured to carry one or more gases, wherein the main flow path has an inlet node, an outlet node, and a recirculation node arranged between the inlet node and the outlet node; an EGR flow path coupled to the main flow path and configured to divert, at the recirculation node, a recirculated exhaust gas from the main flow path and recirculate the recirculated exhaust gas to the inlet node; an engine arranged on the main flow path downstream from the inlet node, wherein the engine is configured to receive a gas mixture including ambient air and the recirculated exhaust gas, produce an exhaust gas, and output the exhaust gas and the recirculated exhaust gas in an exhaust stream; a direct contact cooler (DCC) arranged on the main flow path downstream from the engine, for receiving the exhaust stream, and upstream from the recirculation node and the outlet node, wherein the DCC is configured to quench the exhaust stream to lower a temperature of the exhaust stream; and a condenser arranged on the main flow path downstream from the DCC and upstream from the recirculation node and the outlet node, wherein the condenser is configured to condense the exhaust stream such that the exhaust stream is cooled further and such that water is removed from the exhaust stream.

An exhaust system with a semi-closed cycle may include a main flow path configured to carry one or more gases, wherein the main flow path has an inlet node, an outlet node, and a recirculation node arranged between the inlet node and the outlet node; an EGR flow path coupled to the main flow path and configured to divert, at the recirculation node, a recirculated exhaust gas from the main flow path and recirculate the recirculated exhaust gas to the inlet node; an engine arranged on the main flow path downstream from the inlet node, wherein the engine is configured to receive a gas mixture including ambient air and the recirculated exhaust gas, produce an exhaust gas, and output the exhaust gas and the recirculated exhaust gas in an exhaust stream; an EGR fan arranged on the EGR flow path and configured to regulate a flowrate of the recirculated exhaust gas to the main flow path based on a gas concentration of a target gas in the main flow path, wherein the target gas is an oxygen gas or a $CO_2$ gas; a filtration unit arranged on the EGR flow path between the EGR fan and the inlet node, wherein the filtration unit includes hydrophobic filter elements that are configured to remove entrained water and solid particulates from the recirculated exhaust gas; and a condenser arranged on the EGR flow path between the EGR fan and the filtration unit, wherein the condenser is configured to condense the recirculated exhaust gas such that the recirculated exhaust gas is cooled and such that water is removed from the recirculated exhaust gas.

DETAILED DESCRIPTION

Figure 1:
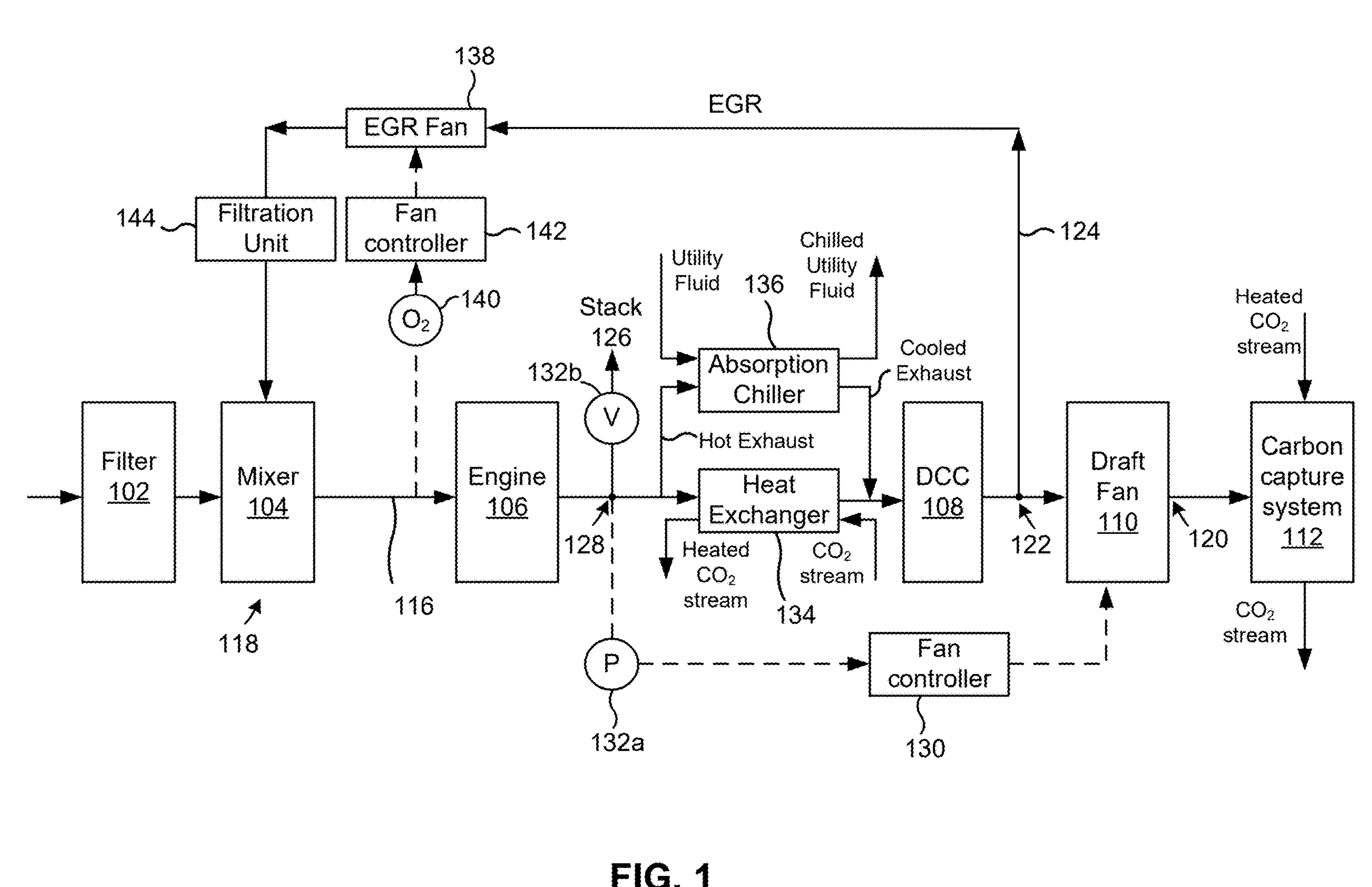
FIG. 1 shows a schematic block diagram of an exhaust system that includes a semi-closed cycle according to one or more implementations.

A carbon capture system may use a carbon dioxide ($CO_2$) thermal swing adsorption (TSA) process to capture $CO_2$ from an exhaust produced by an engine. The carbon capture system may include a plurality of capture vessels that are configured to be respectively cycled through a plurality of stages of the $CO_2$-TSA process, including a $CO_2$ capture stage (adsorption), a regeneration stage, and a cooling stage. The plurality of capture vessels are respectively coupled to an adsorption inlet for receiving the exhaust during the $CO_2$ capture stage. Each capture vessel includes capture media, such as mole sieves or another adsorbent, for capturing $CO_2$ during a respective $CO_2$ capture stage.

A capture medium's capacity for capturing an adsorbate, such as $CO_2$ or water, is higher at lower temperatures, and decreases with increasing temperature. Additionally, allowing the temperature of the capture media to increase may cause the capture media to release a captured adsorbate. Moreover, when capture media are operated at lower capture efficiencies (e.g., due to higher capture media temperatures), more capture media are needed to capture a desired quantity of adsorbate, resulting in a need for higher quantities of capture media and larger capture vessels, which increases system costs. For example, lower carbon capture efficiencies lead to higher power consumption and higher operational costs. In view of these considerations, cooling the capture media prior to and/or during adsorption increases an adsorbate capture efficiency of the capture media, including increasing adsorbate capture capacity. Cooling the capture media prior to and/or during adsorption may also lead to smaller quantities of capture media and smaller carbon capture vessels being needed for adsorbate capture.

An exhaust system, including the engine and an SCC, may be coupled upstream from the carbon capture system (e.g., upstream from the adsorption inlet). The exhaust system is configured to process the exhaust prior to providing the exhaust to the carbon capture system. Processing the exhaust may include cooling and dehydrating the exhaust. Depending on a combustion design of the engine, the SCC may be used to more than double a $CO_2$ concentration at an engine inlet of an engine, without use of an oxygen plant. In some examples, the $CO_2$ concentration may be increased by more than a factor of five using SCC and enhanced cooling techniques described herein.

A density of gas at the engine inlet impacts an amount of output power produced by the engine. For example, a higher density gas at the engine inlet allows for more fuel to be injected into the engine, which creates more power. The density of the gas may be increased by lowering a temperature of the gas and/or by increasing a volume of higher-density gas, such as $CO_2$, which also displaces lower-density gas, such as air. The exhaust system disclosed herein may be configured to increase the density of the gas at the engine inlet both by cooling the gas and by increasing the $CO_2$ concentration of the gas. The exhaust system uses an exhaust gas recirculation (EGR) flow path of the SCC to recirculate a recirculated exhaust gas to the engine inlet. Cooling techniques are utilized within the exhaust system to lower a temperature of the recirculated exhaust gas. Moreover, the recirculated exhaust gas has a high $CO_2$ concentration. The recirculated exhaust gas is used as part of a gas mixture received at the engine inlet. Thus, the recirculated exhaust gas is used to increase the density of the gas mixture by both lowering a temperature of the gas mixture and increasing the $CO_2$ concentration within the gas mixture. As a result, output power of the engine may be increased under most, if not all, ambient temperature conditions.

In addition, the increase in the $CO_2$ concentration at the engine inlet may result in corresponding reductions in exhaust volume to be processed by the carbon capture system, and may have other benefits, which can include NOx reduction and/or high ambient temperature engine derate reduction. The higher the $CO_2$ concentration, the less total mass of $CO_2$ and air that have to go to the carbon capture system to be processed to achieve a same capture rate. Reducing the exhaust volume may lead to a reduction of equipment size in the carbon capture system used for processing the exhaust (e.g., for capturing $CO_2$ from the exhaust). For example, sizes of the capture vessels and draft fans may be reduced, leading to a reduction in system costs and energy consumption. Moreover, increasing a $CO_2$ concentration in the exhaust output by the engine may also enable technologies for carbon capture that otherwise may not work at low $CO_2$ concentrations. For example, the increase in $CO_2$ concentration may enable a carbon capture system that uses amine solutions to be used. Lastly, the SCC may reduce a sizing of downstream components since an overall volumetric flowrate of $CO_2$ decreases while maintaining a mass flow of $CO_2$. Thus, increasing the $CO_2$ concentration in the exhaust may lead to increased efficiencies within the carbon capture system.

In some implementations, an improved method for chilling a gas mixture provided to an inlet of an engine (e.g., a turbine) is provided. The method may use the SCC to increase engine output power and improve engine performance. The method may also use the SCC to improve $CO_2$ capture performance at the capture vessels. The method may use an absorption chiller utilized for chilling the recirculated exhaust gas. The absorption chiller may also produce a chilled utility fluid that may be used in the carbon capture system to improve carbon capture efficiencies of the capture vessels (e.g., by cooling the capture vessels). For example, the absorption chiller may use exhaust heat of the engine to produce the chilled utility fluid. The chilled utility fluid may be used in heat exchangers (e.g., chiller heat exchangers) for chilling target fluids in the carbon capture system and for condensation purposes. In addition, by extracting the exhaust heat from the exhaust output by the engine to produce the chilled utility fluid, the exhaust provided to the capture vessels of the carbon capture system is also cooled. Since the recirculated exhaust gas is derived from the exhaust, cooling the exhaust by the absorption chiller also causes the recirculated exhaust gas to be cooled, which increases power production at the engine via higher density gas in the gas mixture received at the engine inlet.

The absorption chiller utilizes waste heat from the exhaust via a heat exchanger that drives a thermodynamic process which produces the chilled utility fluid at a very low parasitic load compared to traditional mechanical chilling. The absorption chiller may be utilized for carbon capture purposes but can also be used to chill exhaust gas returning to the engine inlet. The decrease in temperature at the engine inlet enables the engine to operate at or exceed international organization for standardization (ISO) conditions under a wide range of ambient temperatures (e.g., for all ambient temperatures). As a result, the engine may produce an output power that meets or exceeds ISO conditions, all year, irrespective of a temperature of ambient air, which may otherwise not be possible without the use of the absorption chiller. Thus, the absorption chiller may be used to realize significant benefits in engine power production all year (e.g., for a wide range of ambient temperatures).

In some implementations, the exhaust system may include a filtration unit arranged in the EGR flow path. The filtration unit may protect the engine from particulates that precipitate out of water in the exhaust.

In some implementations, the exhaust system may include dehydration media (e.g., silica gel, mole sieves, activated carbon, activated alumina, or another adsorbent) in a dehydration vessel to remove water from the system. Removal of the water may prolong a lifetime of the filtration unit and may reduce a risk of icing that may occur at the engine during freezing ambient temperatures. With the water removed, there are fewer water molecules in the recirculated exhaust gas. With fewer water molecules in the recirculated exhaust gas, there are fewer water molecules at the engine that can form ice crystals.

The cooling of the exhaust stream provided by the absorption chiller may improve carbon capture efficiencies of the carbon capture vessels by maintaining lower temperatures at the carbon capture vessels during the $CO_2$ capture stage. Cooling the exhaust stream, from which $CO_2$ is to be captured, aids in maintaining lower capture media temperatures, and thus improves the carbon capture efficiencies of the carbon capture vessels. As a result, use of absorption chilling provided by the absorption chiller allows for a performance increase of capture media inside the carbon capture vessels.

By chilling the exhaust stream provided to the carbon capture vessels, the absorption chiller may be used to improve an adsorption condition within each of the carbon capture vessels, resulting in substantial additional capacity within the capture media. Moreover, the chilled utility fluid produced by the absorption chiller may be used to further improve system efficiencies throughout the carbon capture system by including one or more chiller heat exchangers that use the chilled utility fluid to cool one or more target fluids within the carbon capture system. As a result, waste heat from the exhaust stream may be used as a heat source for producing the chilled utility fluid to further improve system efficiencies, reduce power consumption, and reduce system and operation costs. With a proper selection of the capture media, or media mix, to include metal organic frameworks (MOF), mole sieves, activated carbon, alumina, and/or silica gels, and a cooling temperature achieved by the absorption chiller, optimum conditions for highest system performance can be achieved.

Temperature relative terms, such as “warm,” “hot,” “hotter,” “cold,” “colder,” “cool,” “cooler,” and the like, may be used herein for ease of description to describe one element or feature’s relationship to another element(s) or feature(s) and are meant to be relative to each other and not restricted to any specific range of absolute temperature unless specifically defined. Even if specifically defined, absolute temperatures or temperature ranges are intended to serve as examples.

In some implementations, “dry,” “lean,” “wet,” and “rich” may be used herein for ease of description to describe one element or feature’s relationship to another element(s) or feature(s) and are meant to be relative to each other and not restricted to any specific range of percent by volume. For example, “dry” may correspond to a gas or fluid that contains less water content than a wet gas or a wet fluid. Similarly, “lean” may correspond to a gas or fluid that contains less water content than a rich gas or a rich fluid. For example, in some implementations, a dry gas or a dry fluid may contain 50% less water than a corresponding wet gas or a corresponding wet fluid, respectively. In some implementations, a dry gas or a dry fluid may contain 75% less water than a corresponding wet gas or a corresponding wet fluid, respectively. In some implementations, a dry gas or a dry fluid may contain 90% less water than a corresponding wet gas or a corresponding wet fluid, respectively. In some implementations, a lean gas or a lean fluid may contain 50% less water than a corresponding rich gas or a corresponding rich fluid, respectively. In some implementations, a lean gas or a lean fluid may contain 75% less water than a corresponding rich gas or a corresponding rich fluid, respectively. In some implementations, a lean gas or a lean fluid may contain 90% less water than a corresponding rich gas or a corresponding rich fluid, respectively.

In some implementations, “dry” and “lean” may mean substantially free of water or water molecules. “Substantially free” may mean less than 1% by volume. Thus, “substantially free of water molecules” may refer to a fluid or a fluid mixture that is composed of less than 1% of water molecules by volume. In addition, “wet” or “rich” may mean saturated with or at least partially saturated with water or water molecules. For example, a fluid that is wet or rich may be composed of at least 1% of water molecules by volume.

“Chiller” may refer to a device that chills, cools, or otherwise reduces a temperature of a target fluid. A heat exchanger that is used as a chiller (e.g., a chiller heat exchanger), may receive a refrigerant, a standard utility fluid, or a chilled utility fluid, and use the refrigerant, the standard utility fluid, or the chilled utility fluid to reduce the temperature of the target fluid by a thermal exchange. In contrast, “heater” may refer to a device that heats or otherwise increases a temperature of a target fluid. A heat exchanger that is used as a heater (e.g., a heater heat exchanger) may receive a hot utility fluid, and use the hot utility fluid to increase the temperature of the target fluid by a thermal exchange.

In the present disclosure, expressions including ordinal numbers, such as “first”, “second”, and/or the like, may modify various elements. However, such elements are not limited by such expressions. For example, such expressions do not limit the sequence and/or importance of the elements. Instead, such expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

FIG. 1 shows a schematic block diagram of an exhaust system 100 that includes a semi-closed cycle according to one or more implementations. The exhaust system 100 includes a filter 102 (e.g., an air filter), a mixer 104 (e.g., an inlet mixer), an engine 106, a direct contact cooler (DCC)

108, a draft fan 110 (e.g., a carbon capture fan), and a carbon capture system 112 that includes carbon capture vessels. In addition, the exhaust system 100 may include one or more diverter valves. A diverter valve may be a 3-way diverter valve or a t-damper that includes an inlet valve (e.g., an input path) and two output valves (e.g., two output paths).

Components of the exhaust system 100 may be interconnected by a plurality of manifolds, ducts, and/or pipes that may be configured to carry one or more fluids (e.g., liquids, gases, or gas-liquid mixtures). For example, ducting may be used to form one or more flow paths that connect one or more of the components. The exhaust system 100 may have a main flow path 116 configured to carry one or more gases. The main flow path 116 may have an inlet node 118, an outlet node 120, and a recirculation node 122 arranged between the inlet node 118 and the outlet node 120. Additionally, the exhaust system 100 may have an exhaust gas recirculation (EGR) flow path 124 coupled to the main flow path 116. The EGR flow path 124 may be configured to divert a recirculated exhaust gas from the main flow path 116, at the recirculation node 122, and recirculate the recirculated exhaust gas to the inlet node 118. In other words, the EGR flow path 124 may draw the recirculated exhaust gas (e.g., a portion of cooled exhaust gas) from the main flow path 116 at the recirculation node 122 and recirculate the recirculated exhaust gas to the inlet node 118. A diverter valve may be arranged at the recirculation node 122 to divert the recirculated exhaust gas from the main flow path 116, while allowing some of the exhaust gas to continue through the draft fan 110 to the outlet node 120 (and ultimately to the carbon capture system 112).

The main flow path 116 and the EGR flow path 124 form the semi-closed cycle in which some of a cooled exhaust is recirculated from the recirculation node 122 back to the inlet node 118. A mixture of the cooled exhaust (e.g., the recirculated exhaust gas) with air increases the concentration of $CO_2$, while decreasing the concentration of $O_2$, at an inlet of the engine 106. Additionally, the exhaust system 100 may have a stack flow path 126 coupled to a stack node 128 of the main flow path 116 located between the engine 106 and the DCC 108.

In this example, the mixer 104 is arranged on the main flow path, at the inlet node 118. The mixer 104 may be configured to receive ambient air from the filter 102 and the recirculated exhaust gas from the EGR flow path 124, and produce a gas mixture for the engine 106.

The engine 106 is arranged on the main flow path 116 downstream from the inlet node 118. The engine 106 may receive the gas mixture including the ambient air and the recirculated exhaust gas, and produce an exhaust gas via combustion. The engine 106 may output the exhaust gas as an exhaust stream (e.g., a hot exhaust stream). The engine 106 produces an output power corresponding to a density of the gas mixture, with higher output power being produced for higher densities. The density of the gas mixture may be increased by lowering a temperature of the gas mixture (e.g., via cooling) and/or by increasing a $CO_2$ concentration of the gas mixture.

The stack flow path 126 may be directly coupled to the main flow path 116, at the stack node 128, without a diverter valve or any other shut-off mechanism that can close off the stack flow path 126 from the main flow path 116. In other words, the stack node 128 is a permanently open node. As a result, the exhaust system 100 may include a pressure control system configured to regulate a fan speed of the draft fan 110 based on a pressure in the stack flow path 126 in order to maintain the pressure in the stack flow path 126 at a target gauge pressure. The target gauge pressure may be zero pounds per square inch gauge (psig) or less than zero (e.g., a negative gauge pressure) such that, during a normal system operation, the exhaust gas in the main flow path 116 does not flow outward from the stack flow path 126 into the atmosphere. A slightly negative gauge pressure in the stack flow path 126 may result in a small amount of air being drawn backwards down the stack, which the exhaust system 100 can tolerate. Thus, the stack flow path 126 may be configured to release at least a portion of the exhaust gas into the atmosphere based on the pressure in the stack flow path 126 being greater than zero. Thus, the fan speed of the draft fan 110 may be controlled in order to regulate the pressure in the stack flow path 126, which may be used to prevent the exhaust gas from flowing through the stack flow path 126.

The pressure control system may include a fan controller 130 and at least one pressure control sensor **132*a* and/or 132*b* configured to generate a sensor signal corresponding to the pressure in the stack flow path 126. The fan controller 130 may regulate the fan speed of the draft fan 110 based on the sensor signal such that the pressure in the stack flow path 126 is driven toward the target gauge pressure. The fan controller 130 may include one or more processors for processing the sensor signal for determining control values based on a measured pressure and the target gauge pressure. For example, the pressure control sensor 132*a* may be a pressure sensor that measures the pressure in the stack flow path 126 and provides a corresponding sensor signal to the fan controller 130. The pressure control sensor 132*b* may be a gas flow velocity sensor that can detect a gas flow in the stack flow path 126 and/or measure a velocity of the gas flow. The pressure control sensor 132*b* may provide a corresponding sensor signal to the fan controller 130. The fan controller 130 may use one or both sensor signals to regulate the fan speed of the draft fan 110 in order to maintain the pressure in the stack flow path 126 at the target gauge pressure. As a result, a diverter valve located at the stack node 128** can be eliminated.

Moreover, the stack flow path 126 may be configured to release at least a portion of the exhaust gas from the main flow path 116 into the atmosphere during a system fault of the exhaust system 100. For example, if the draft fan 110 were to fail, the pressure in the stack flow path 126 would become positive and exhaust gas would flow out of the stack flow path 126 into the atmosphere. Allowing the exhaust gas to flow out of the stack flow path 126 (e.g., out of the stack) may prevent one or more components of the exhaust system 100 from being damaged and/or may prevent a hazardous condition from developing that may endanger system personnel. Thus, release of the exhaust gas from the stack may be automatically triggered by a failure of the draft fan 110. The release of the exhaust gas from the stack may be automatically triggered without a delay that would be otherwise be caused by a slow operation of a diverter valve arranged at the stack node 128. Thus, a permanently open node at a junction of the main flow path 116 and the stack flow path 126 in combination with the pressure control system may increase system safety and system reliability. In addition, elimination of a diverter valve at the stack node 128 may reduce system costs.

The exhaust system 100 may include a heat exchanger 134 coupled to the main flow path 116 downstream from the engine 106. The heat exchanger 134 receives a first portion of the exhaust stream, and transfers heat from the first portion of the exhaust stream to an exchanger fluid, resulting in the exchanger fluid being heated and the first portion of the exhaust stream being cooled to produce a first portion of a cooled exhaust stream. In some examples, the exhaust stream coming from the engine 106 may have a temperature of 800° Fahrenheit (F) or higher.

In some implementations, the exchanger fluid is a $CO_2$ stream that is provided by the carbon capture system 112. For example, the $CO_2$ stream may be released by a capture vessel operating in a regeneration stage. The heat exchanger 134 may heat the $CO_2$ stream by thermal exchange with the first portion of the exhaust stream to produce a heated $CO_2$ stream. The heated $CO_2$ stream may be directed back to the carbon capture system 112 for improving one or more functions of the carbon capture system 112. For example, the heated $CO_2$ stream may be directed back to the capture vessel operating in the regeneration stage to increase an amount of $CO_2$ released by the capture vessel operating in the regeneration stage.

The exhaust system 100 may include an absorption chiller 136 coupled to the main flow path 116 downstream from the engine 106. The absorption chiller 136 receives a second portion of the exhaust stream, extracts heat from the second portion of the exhaust stream to cool the second portion of the exhaust stream and produce a second portion of the cooled exhaust stream. In some implementations, the absorption chiller 136 receives a utility fluid, and uses the heat extracted from the second portion of the exhaust stream to lower a temperature of the utility fluid to produce a chilled utility fluid.

The absorption chiller 136 may include a generator, a condenser, an evaporator, and an absorber. The generator may receive the second portion of the hot exhaust stream, and use the heat extracted from the second portion of the hot exhaust stream to evaporate water vapor from a refrigerant mixture. The condenser may condense the water vapor into condenser water by exposing the water vapor to cooler temperatures. The evaporator, at low pressure, may receive the utility fluid and the condenser water, cause the condenser water to cool based on the low pressure, and cool the utility fluid through a thermal exchange with the condenser water to produce the chilled utility fluid. The low pressure may be a vacuum pressure or at a pressure near vacuum pressure. The absorber may mix the condenser water with a refrigerant to produce the refrigerant mixture, and provide the refrigerant mixture to the generator.

The heat from the second portion of the hot exhaust stream is used in the generator to heat the refrigerant mixer to evaporate the water out of the refrigerant mixer. The evaporated water is then condensed by the condenser and recycled to the evaporator, which is cooled due to the low pressure in the evaporator and in turn is used to cool the utility fluid. The heat from the second portion of the hot exhaust stream is ultimately used to produce the chilled utility fluid. Thus, not only is heat extracted from the second portion of the hot exhaust stream to cool the exhaust stream, but the heat extracted from the second portion of the hot exhaust stream is used indirectly to cool the utility fluid to produce the chilled utility fluid. The carbon capture system 112 may include one or more chiller heat exchangers configured to receive the chilled utility fluid, and cool one or more target fluids via a respective thermal exchange with the chilled utility fluid. The one or more target fluids may include an exhaust gas, a depleted flue gas (e.g., that exits a capture vessel after carbon capture), and/or carbon dioxide present in the carbon capture system 112. While being used by the one or more chiller heat exchangers, the chilled utility fluid increases in temperature and returns to the absorption chiller 136 as utility fluid to be cooled again.

An output of the heat exchanger 134 and an output of the absorption chiller 136 are coupled such that the first portion of the cooled exhaust stream and the second portion of the cooled exhaust stream are combined to produce the cooled exhaust stream. In some implementations, the heat exchanger 134 and the absorption chiller 136 are connected in parallel via manifolds (e.g., a respective pipe or chamber branching into several openings) configured to carry respective exhaust streams. Thus, the absorption chiller 136 outputs cooler exhaust back into a main exhaust stream. The cooler exhaust is used to lower a temperature of the main exhaust stream flow, which is also lowered by passing through heat exchanger 134. The heat exchanger 134 and an output of the absorption chiller 136 operate in parallel to lower an overall temperature of the main exhaust stream flow. The cooled exhaust stream is directed further along the main flow path 116 toward the recirculation node 122 and the outlet node 120. In some examples, the cooled exhaust stream may have a temperature between 20° and 400° F.

The DCC 108 is arranged on the main flow path 116 downstream from the heat exchanger 134. The DCC 108 is configured to cool the cooled exhaust stream further to lower a temperature of the cooled exhaust stream. For example, the DCC 108 may cool the cooled exhaust stream by quenching the cooled exhaust stream. For example, the DCC 108 may reduce a temperature of the cooled exhaust stream to 100° F. or less. As a result of the quenching, the cooled exhaust stream leaving the DCC 108 may contain a higher amount of water (e.g., water vapor) or may be saturated with water vapor.

The draft fan 110 is arranged on the main flow path 116 downstream from the exhaust DCC 108. The draft fan 110 is configured to receive at least a portion of the cooled exhaust stream from the DCC 108 and control a gas flowrate through the main flow path 116. In addition, the draft fan 110 may be configured to provide the portion of the cooled exhaust stream to the carbon capture system 112.

A diverter valve may be arranged at the recirculation node 122, upstream from the draft fan 110. One of the outlet valves of the diverter valve may be an EGR valve configured to divert the recirculated exhaust gas from the recirculation node 122 of the main flow path 116 to the EGR flow path 124. The diverter valve at the recirculation node 122 may be configured to receive the cooled exhaust gas from the DCC 108, divert the recirculated exhaust gas from the main flow path 116 to the EGR flow path 124 through the EGR valve, and provide a remaining portion of the cooled exhaust gas to the outlet node 120 through a second outlet valve. The carbon capture system 112 may be coupled to the outlet node 120 and may be configured to capture a $CO_2$ gas present in the remaining portion of the cooled exhaust gas.

An EGR fan 138 is arranged on the EGR flow path 124. The EGR fan 138 may be configured to draw in a portion of the cooled exhaust gas into the EGR flow path 124 from the main flow path 116 as the recirculated exhaust gas. In addition, the EGR fan 138 may be configured to regulate a flowrate of the recirculated exhaust gas to the main flow path 116 (e.g., to the inlet node 118). In some implementations, the EGR fan 138 may be configured to regulate the flowrate of the recirculated exhaust gas to the main flow path 116 based on a gas concentration of a target gas in the main flow path 116. The target gas may be an oxygen gas or a $CO_2$ gas. In some implementations, the EGR fan 138 may be used, in combination with the draft fan 110, to maintain zero or negative pressure in the stack flow path 126.

A gas concentration sensor 140 may be provided in the main flow path 116 upstream from the DCC 108 (e.g., between the mixer 104 and the DCC 108), and may generate a sensor signal representative of the gas concentration of the target gas.

A fan controller 142 may regulate a fan speed of the EGR fan 138 based on the sensor signal provided by the gas concentration sensor 140 in order to regulate the flowrate of the recirculated exhaust gas diverted from the main flow path 116 such that the gas concentration is maintained within a target gas concentration range. The fan controller 142 may include one or more processors for processing the sensor signal for determining control values based on a measured gas concentration and the target gas concentration range. Thus, the fan controller 142, in combination with the gas concentration sensor 140, may be used to regulate the flowrate of the recirculated exhaust gas through the EGR flow path 124 and to regulate the gas concentration of the target gas in the main flow path 116. For example, since the exhaust gas includes $CO_2$, increasing the fan speed of the EGR fan 138 may increase the flow rate of the recirculated exhaust gas and may increase the $CO_2$concentration at the inlet node 118 and flowing into the main flow path 116.

The EGR fan 138 may be controlled to achieve a desired EGR flowrate, resulting in a desired level of $O_2$ and/or $CO_2$ concentration at the engine inlet. The EGR fan 138 may be operated at low power since a pressure that the EGR fan 138 must overcome is only that of a ducting pressure drop and pressure drop at the mixer. The EGR fan 138 may also eliminate a requirement for a purge blower for a gas turbine startup, since the EGR fan 138 can be used to achieve a desired number of air volume sweeps to enable safe startup of the gas turbine. A loss of the EGR fan 138 due to failure may result in some flow going through the stack flow path 126, and a loss of the draft fan 110 may have a similar result. In cases where the draft fan 110 and/or the EGR fan 138 stop operating or operating correctly, the engine 106 can continue to run without any risk of damage until system faults that resulted in one or both fan failures can be addressed.

A filtration unit 144 may be provided on the EGR flow path 124 downstream from the EGR fan 138 (e.g., between the EGR fan 138 and the inlet node 118). The filtration unit 144 includes hydrophobic filter elements that are configured to remove entrained water and solid particulates from the recirculated exhaust gas, thereby protecting the engine 106

The mixer 104 may be arranged on the main flow path 116, at the inlet node 118. The mixer 104 may receive the ambient air and the recirculated exhaust gas, and produce the gas mixture for the engine 106.

The exhaust system 100 provides a pressure balanced stack that eliminates the diverter valves in the stack flow path and in the main flow path between the engine 106 and the exhaust DCC 108. If any failure occurred, such as a failure of the draft fan 110 or a blockage in the carbon capture system 112, the exhaust would immediately go up the stack, since the stack flow path is always open, and little to no risk to the engine 106 or personnel would exist. When properly pressure balanced, respective portions of a full exhaust flow from the engine 106 through the draft fan 110 and the EGR fan 138.

Based on the cooling of the exhaust stream provide by the heat exchanger 134, the absorption chiller 136, and the DCC 108, a temperature of the recirculated exhaust gas, derived from the cooled exhaust stream, is lower than a temperature of the ambient air, resulting in a lower mix temperature. Thus, cooler, denser gas can be fed into the inlet node 118, displacing lower-density air and creating a higher-density gas mixture at the inlet of the engine 106. Moreover, the temperature and a moisture content of the recirculated exhaust gas, derived from the cooled exhaust stream, enable the engine 106 to produce an output power that meets or exceeds ISO conditions irrespective of a temperature of the ambient air (e.g., all year round regardless of environmental conditions). For example, the ISO conditions are 59° F. ambient temperature, 14.7 pounds per square inch (PSI) atmospheric pressure, and 60% relative humidity. The temperature and a $CO_2$ concentration of the recirculated exhaust gas are controlled by the exhaust system 100 to maintain a density of the gas mixture, at the inlet of the engine 106, at a level sufficient for the engine 106 to produce the output power that meets or exceeds the ISO conditions irrespective of the temperature of the ambient air (e.g., all year round regardless of environmental conditions).

The recirculated exhaust gas is configured to increase a density of the gas mixture, enabling the engine 106 to burn a higher quantity of fuel, generate a higher amount of power, and lower a net heat rate consumed by the engine 106. Thus, significant improvements in engine performance can be realized based on the cooling of the exhaust stream provide by the heat exchanger 134, the absorption chiller 136, and the DCC 108. Moreover, the EGR fan 138 controls a volume of recirculated exhaust gas provided to the inlet node 118, and thus can control the temperature and the density of the gas mixture at the inlet of the engine 106 to ensure that the engine 106 satisfies the ISO conditions in terms of output power irrespective of the temperature of the ambient air (e.g., for all ambient temperatures).

Figure 2:
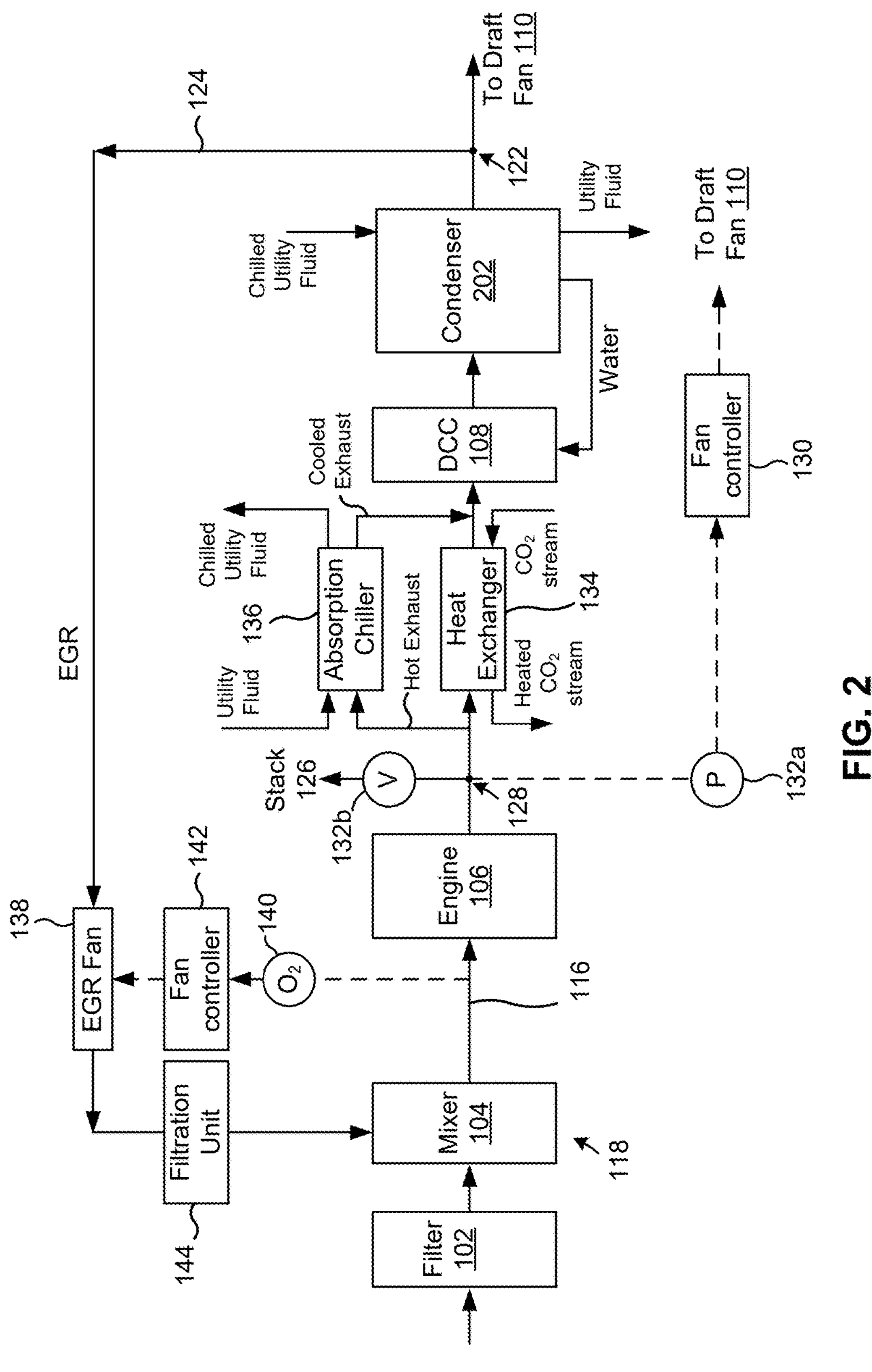
FIG. 2 shows a schematic block diagram of an exhaust system that includes a semi-closed cycle according to one or more implementations.

FIG. 2 shows a schematic block diagram of an exhaust system 200 that includes a semi-closed cycle according to one or more implementations. The exhaust system 200 is similar to the exhaust system 100 described in connection with FIG. 1. While the draft fan 110 and the carbon capture system 112 are not illustrated in FIG. 2, the draft fan 110 and the carbon capture system 112 are still part of the exhaust system 200 and function in a similar manner as described in connection with FIG. 1.

The exhaust system 200 includes a condenser 202 arranged on the main flow path 116 downstream from the DCC 108 and upstream from the recirculation node 122 and the outlet node 120 (not illustrated). The condenser 202 condenses the cooled exhaust stream received from the DCC 108 such that the cooled exhaust stream is cooled further, and such that water is removed from the cooled exhaust stream. In some examples, the condenser 202 cools the cooled exhaust stream to 50° F. or less. The condenser 202 may provide the water, condensed from the cooled exhaust stream, to the DCC 108 for quenching the cooled exhaust stream. The removal of the water from the cooled exhaust stream, and thus from the recirculated exhaust gas, may increase a lifetime of the filtration unit 144 and may reduce a risk of icing at the engine 106.

In some implementations, the condenser 202 may use the chilled utility fluid from the absorption chiller 136 to condense the cooled exhaust stream. Thus, waste heat from the hot exhaust stream produced by the engine 106, and used to produce the chilled utility fluid, may be used indirectly to condense the cooled exhaust stream at the condenser 202. A temperature of the chilled utility fluid is increased as a result of a thermal exchange with the cooled exhaust stream, producing a warmer utility fluid. The warmer utility fluid is recycled back to the absorption chiller 136 for use as the utility fluid, which is subsequently chilled by the absorption chiller 136 to produce the chilled utility fluid.

The condenser 202 cools the cooled exhaust stream, which causes the temperature of the recirculated exhaust gas in the EGR flow path 124 to decrease. The cold gas interacts with the ambient air being pulled through the filter 102. As a result, the gas mixture provided by the mixer 104 is much lower than the temperature of the ambient air, resulting in a lower mix temperature. The temperature of the gas mixture, as well as the increase in concentration of $CO_2$ in the gas mixture, increases the density of gas at the inlet of the engine 106. The increase in density allows for more fuel to be burned, to generate more power as well as lower the net heat rate consumed by the engine.

Based on the cooling of the exhaust stream provide by the heat exchanger 134, the absorption chiller 136, the DCC 108, and the condenser 202, a temperature of the recirculated exhaust gas, derived from the cooled exhaust stream, is lower than a temperature of the ambient air, resulting in a lower mix temperature. Thus, cooler, denser gas can be fed into the inlet node 118, displacing lower-density air and creating a higher-density gas mixture at the inlet of the engine 106. Moreover, the temperature and a moisture content of the recirculated exhaust gas, derived from the cooled exhaust stream, enable the engine 106 to produce an output power that meets or exceeds ISO conditions irrespective of a temperature of the ambient air (e.g., all year round regardless of environmental conditions). For example, the ISO conditions are 59° F. ambient temperature, 14.7 PSI atmospheric pressure, and 60% relative humidity. The temperature and a $CO_2$ concentration of the recirculated exhaust gas are controlled by the exhaust system 200 to maintain a density of the gas mixture, at the inlet of the engine 106, at a level sufficient for the engine 106 to produce the output power that meets or exceeds the ISO conditions, irrespective of the temperature of the ambient air (e.g., all year round regardless of environmental conditions).

The recirculated exhaust gas is configured to increase a density of the gas mixture, enabling the engine 106 to burn a higher quantity of fuel, generate a higher amount of power, and lower a net heat rate consumed by the engine 106. Thus, significant improvements in engine performance can be realized based on the cooling of the exhaust stream provided by the heat exchanger 134, the absorption chiller 136, the DCC 108, and the condenser 202. Moreover, the EGR fan 138 controls a volume of recirculated exhaust gas provided to the inlet node 118, and thus can control the temperature and the density of the gas mixture at the inlet of the engine 106 to ensure that the engine 106 satisfies the ISO conditions in terms of output power irrespective of the temperature of the ambient air (e.g., for all ambient temperatures).

Figure 3:
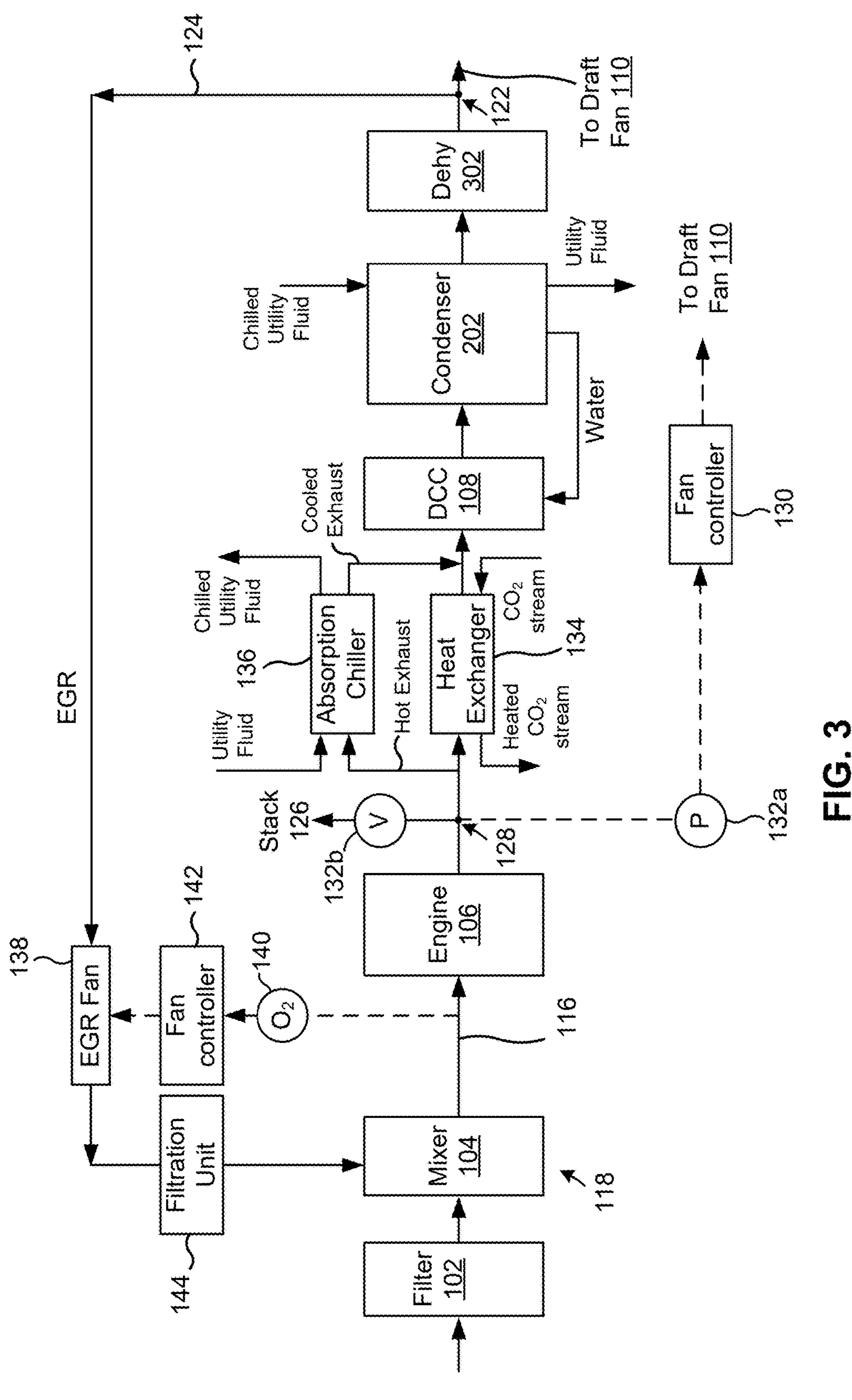
FIG. 3 shows a schematic block diagram of an exhaust system that includes a semi-closed cycle according to one or more implementations.

FIG. 3 shows a schematic block diagram of an exhaust system 300 that includes a semi-closed cycle according to one or more implementations. The exhaust system 300 is similar to the exhaust systems 100 and 200 described in connection with FIGS. 1 and 2. While the draft fan 110 and the carbon capture system 112 are not illustrated in FIG. 3, the draft fan 110 and the carbon capture system 112 are still part of the exhaust system 300 and function in a similar manner as described in connection with FIG. 1.

The exhaust system 300 includes a dehydration vessel 302 arranged on the main flow path 116 downstream from the condenser 202 and upstream from the recirculation node 122 and the outlet node 120 (not illustrated). The dehydration vessel 302 removes additional water from the cooled exhaust stream. Thus, the dehydration vessel 302 reduces a water content in the recirculated exhaust gas.

Dehydration may be required for certain carbon capture processes, which include but are not limited to mole sieves, activated alumina, and activated carbon capture technologies. In addition, the removal of water from the cooled exhaust stream to reduce the water content in the recirculated exhaust gas may protect the engine 106 from solid particulates that may be entrained in the water used by the DCC 108 to quench the exhaust stream. Reducing the water content in the recirculated exhaust gas may also allow the engine to operate in freezing conditions, using the EGR flow path 124, without the risk of icing at a compressor inlet of the engine 106. Operating in freezing conditions can substantially increase output power while improving fuel consumption of the engine 106. The removal of the water from the cooled exhaust stream, and thus from the recirculated exhaust gas, may also increase a lifetime of the filtration unit 144.

Figure 4:
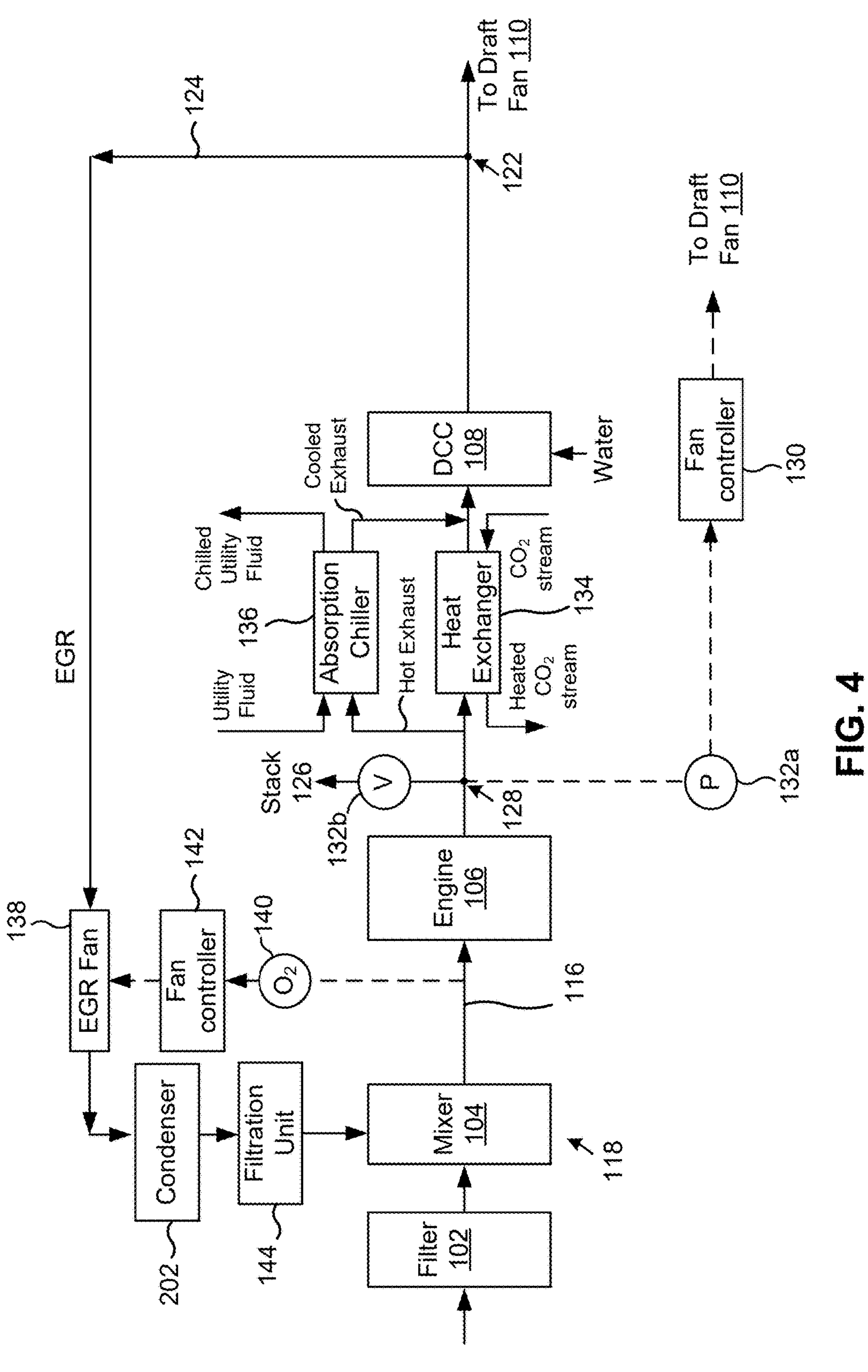
FIG. 4 shows a schematic block diagram of an exhaust system that includes a semi-closed cycle according to one or more implementations.

FIG. 4 shows a schematic block diagram of an exhaust system 400 that includes a semi-closed cycle according to one or more implementations. The exhaust system 400 is similar to the exhaust system 200 described in connection with FIG. 2, with the exception that the condenser 202 is relocated to the EGR flow path 124. The condenser 202 is arranged downstream from the EGR fan 138 and upstream from the filtration unit 144. Thus, the condenser 202 is arranged on the EGR flow path 124 between the EGR fan 138 and the filtration unit 144. The condenser 202 condenses the recirculated exhaust gas such that the recirculated exhaust gas is cooled and such that water is removed from the recirculated exhaust gas. The condenser 202 may use the chilled utility fluid from the absorption chiller 136 to condense and cool the recirculated exhaust gas. In addition, the condenser 202 may provide condensed water to the DCC 108, which may use the condensed water to quench the exhaust stream in the main flow path 116.

Water vapor has a high amount of heat (high thermal energy). As a result, higher volumes of water vapor require higher quantities of energy to cool and condense into liquid water. The recirculated exhaust gas, by volume, is less than the volume of exhaust exiting the DCC 108. Thus, a smaller quantity of energy may be needed to condense water vapor in the EGR flow path 124 than in the main flow path 116. Put another way, by condensing and cooling the recirculated exhaust gas downstream from the EGR fan 138, a duty (e.g., an amount of energy) required by the condenser 202 to condense and cool the recirculated exhaust gas reduces drastically compared to a duty required by the condenser 202 as arranged in FIG. 2. Placing the condenser 202 in the EGR flow path 124 instead of the main flow path 116 also reduces an amount of chilling needed by the absorption chiller 136, thereby reducing a duty of the absorption chiller 136. Reducing the amount of chilling required by the absorption chiller 136 may reduce the size of the absorption chiller 136 as well as the size of the condenser 202. The configuration shown in FIG. 4 may be preferred in cases where less heat is produced by the engine 106 (e.g., an amount of heat in the exhaust stream). For example, a more efficient engine may have a higher power-heat ratio, producing more power and less heat through combustion.

The removal of the water from the recirculated exhaust gas upstream from the filtration unit 144 may increase a lifetime of the filtration unit 144.

Figure 5:
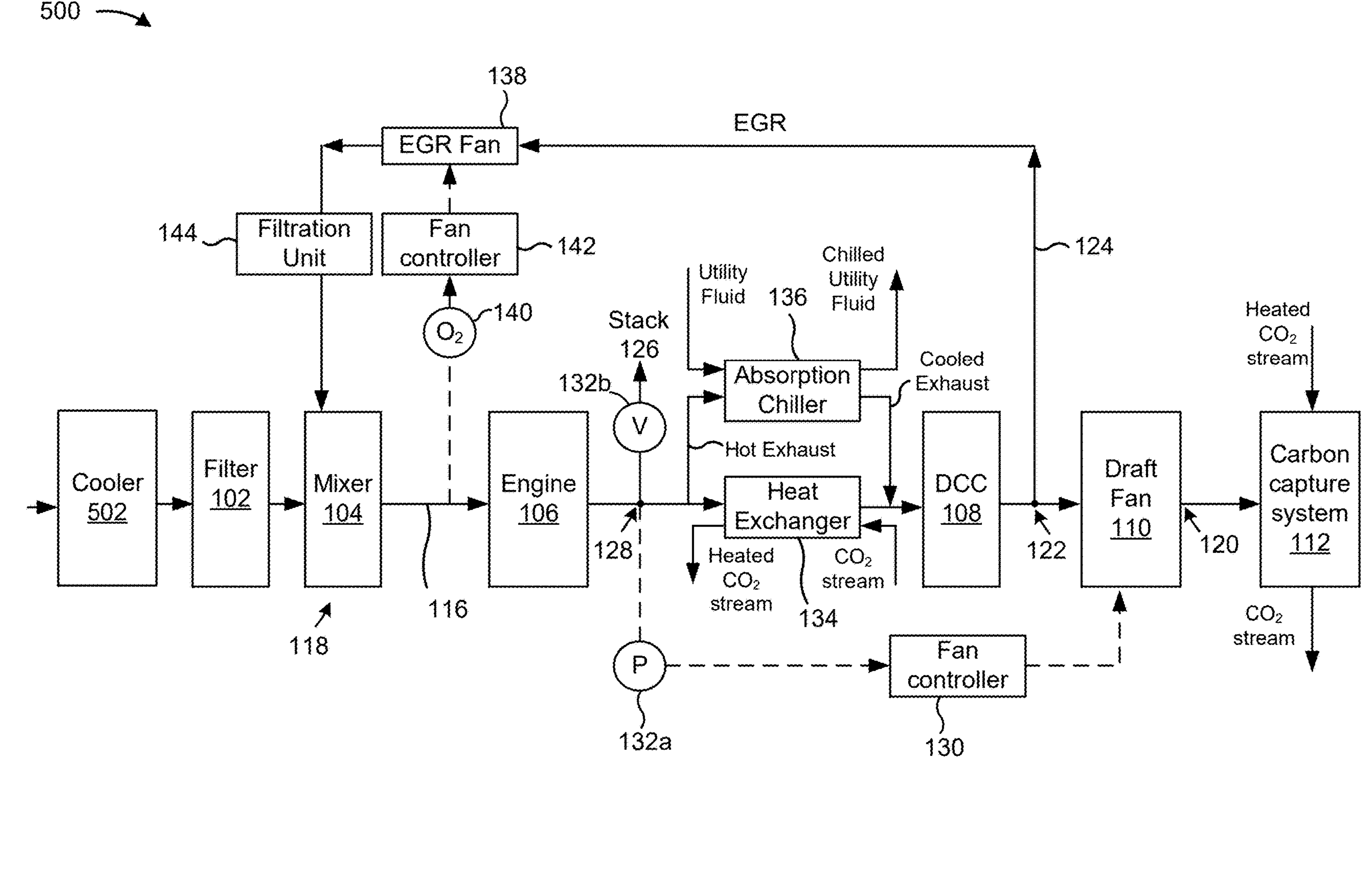
FIG. 5 shows a schematic block diagram of an exhaust system that includes a semi-closed cycle according to one or more implementations.

FIG. 5 shows a schematic block diagram of an exhaust system 500 that includes a semi-closed cycle according to one or more implementations. The exhaust system 500 is similar to the exhaust system 100 described in connection with FIG. 1. The exhaust system 500 includes a cooler 502 arranged upstream from the inlet node 118. For example, the cooler 502 may be arranged upstream from the filter 102. The cooler 502 cools the ambient air prior to providing the ambient air to the inlet node 118. Thus, cooler ambient air is mixed with the recirculated exhaust gas downstream at the mixer 104 to provide a cooler and more dense gas mixture to the engine 106.

Quenching the exhaust stream by the DCC 108 causes the exhaust stream to become saturated with water. Since ambient air is generally not saturated with water, cooling the ambient air is typically less energy intensive than cooling the saturated (wet) exhaust stream that exits the DCC 108. Little to no water is condensed during the cooling of ambient air at the cooler 502 due to the ambient air having lower water content. Thus, placing the cooler 502 upstream from the inlet node 118 may improve operational efficiencies by requiring less energy to cool the gas mixture provided to the engine 106. In addition, an amount of chilling needed by absorption chiller 136, to reduce the temperature of the gas mixture, may be reduced by the cooler 502. As a result, the size of the absorption chiller 136 may be reduced, as compared to the size of the absorption chiller 136 described in FIG. 1. The absorption chiller 136 in FIG. 5 may have a smaller size, yet provide similar performance gains (e.g., engine output power increases) relative to the performance gains provided by the exhaust system 100. Reducing the size of the absorption chiller 136 may reduce system costs (e.g., less expensive absorption chiller) and operational costs (e.g., lower power consumption).

Based on the cooling of the gas mixture provided by the heat exchanger 134, the absorption chiller 136, the DCC 108, and the cooler 502, a cooler, denser gas can be fed into the engine 106. Moreover, the temperature and a moisture content of the gas mixture enable the engine 106 to produce an output power that meets or exceeds ISO conditions irrespective of a temperature of the ambient air (e.g., all year round regardless of environmental conditions). For example, the ISO conditions are 59° F. ambient temperature, 14.7 PSI atmospheric pressure, and 60% relative humidity. The temperature and a $CO_2$ concentration of the gas mixture are controlled by the exhaust system 500 to maintain a density of the gas mixture, at the inlet of the engine 106, at a level sufficient for the engine 106 to produce the output power that meets or exceeds the ISO conditions irrespective of the temperature of the ambient air (e.g., all year round regardless of environmental conditions).

The cooling by the cooler 502 and the cooled, dense recirculated exhaust gas are configured to increase a density of the gas mixture, enabling the engine 106 to burn a higher quantity of fuel, generate a higher amount of power, and lower a net heat rate consumed by the engine 106. Heat rate is how much fuel is required to make a certain amount of power. Thus, significant improvements in engine performance can be realized based on the increasing the density of the gas mixture. Moreover, the EGR fan 138 controls a volume of recirculated exhaust gas provided to the inlet node 118, and thus can control the temperature and the density of the gas mixture at the inlet of the engine 106 to ensure that the engine 106 satisfies the ISO conditions in terms of output power irrespective of the temperature of the ambient air (e.g., for all ambient temperatures).

Figure 6:
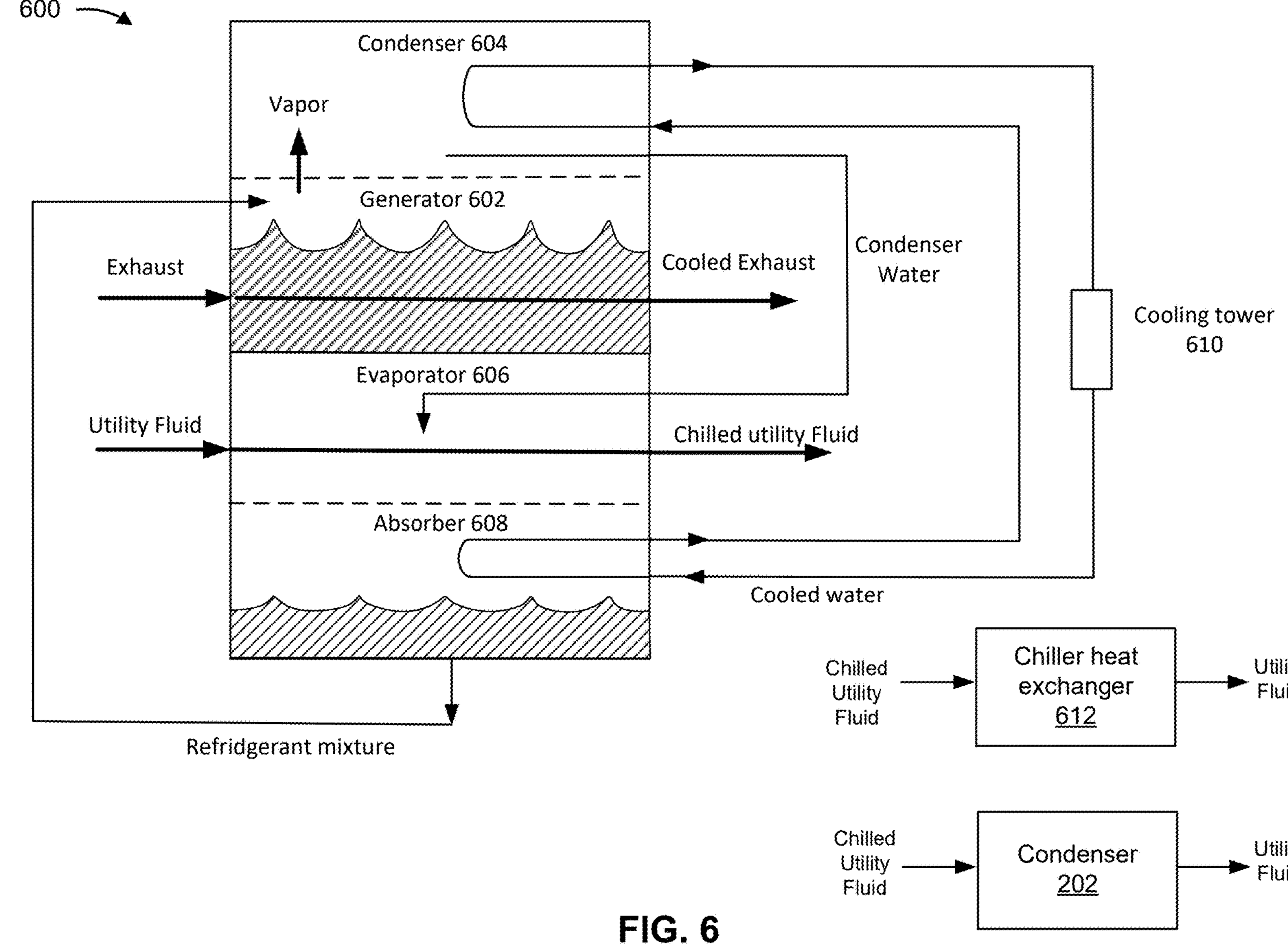
FIG. 6 illustrates an absorption chiller according to one or more implementations.

FIG. 6 shows an absorption chiller 600 according to one or more implementations. The absorption chiller 600 may be similar to absorption chiller 136 described in connection with FIG. 1. The absorption chiller 600 may include a generator 602, a condenser 604, an evaporator 606, and an absorber 608.

The generator 602 may receive a refrigerant mixture from the absorber 608. In addition, the generator 602 may receive a hot exhaust stream from an exhaust source, such as engine 106 described in connection with FIG. 1. For example, the hot exhaust stream may be the second portion of the exhaust stream. The generator 602 may use heat extracted from the second portion of the exhaust stream to evaporate water vapor from a refrigerant mixture. As a result of the heat from the exhaust stream being used to produce the water vapor, the exhaust stream loses heat and is cooled into cooled exhaust. The cooled exhaust exits the generator 602. The cooled exhaust may correspond to the second portion of the cooled exhaust stream described in connection with FIG. 1. The hot exhaust stream and the cooled exhaust may be contained within a pipe that is fed into and out of the generator 602.

The condenser 604 may condense the water vapor into condenser water by exposing the water vapor to cooler temperatures. For example, the water vapor may condense into liquid as the water vapor comes into contact with a cooling coil of the condenser 604. Water within the cooling coil may be provided by a cooling tower 610.

The evaporator 606 may receive a utility fluid and the condenser water through appropriate piping. The evaporator 606 may be a low-pressure chamber that causes the condenser water to cool based on a low pressure, and cool the utility fluid through a thermal exchange with the condenser water to produce the chilled utility fluid. The low pressure may be a vacuum pressure or at a pressure near vacuum pressure. The utility fluid and the chilled utility fluid may be contained within a pipe that is fed into and out of the evaporator 606.

The absorber 608 may mix the condenser water with a refrigerant, such as lithium bromide, to produce the refrigerant mixture, and provide the refrigerant mixture to the generator 602. A cooling tower water loop may also pass through the absorber 608 to carry away unwanted heat.

The absorption chiller 600 may provide the chilled utility fluid to one or more components of an exhaust system. For example, the absorption chiller 600 may provide the chilled utility fluid to the condenser 202. Additionally, or alternatively, the absorption chiller 600 may provide the chilled utility fluid to one or more chiller heat exchangers 612 of the carbon capture system 112. The one or more chiller heat exchangers 612 may receive the chilled utility fluid, and cool one or more target fluids via a respective thermal exchange with the chilled utility fluid.

INDUSTRIAL APPLICABILITY

The exhaust systems 100, 200, 300, 400, 500 are configured with a design that improves engine performance of an engine and improves carbon capture of a carbon capture system. An absorption chiller utilizes the waste heat via a heat exchanger that drives a thermodynamic process which produces a chilled utility fluid at a very low parasitic load compared to traditional mechanical chilling. The absorption chiller may be utilized for carbon capture purposes but can also be used to chill exhaust gas returning to the inlet of the gas turbine or reciprocating engine. The decrease in temperature allows for a gas turbine or a reciprocating engine to operate at ISO conditions, or better, year-round, which provides an exceptional increase in power output despite changes in ambient temperature throughout the year.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

Temperature relative terms, such as "warm," "hot," "hotter," "cold," "colder," "cool," "cooler," and the like, may be used herein for ease of description to describe one element's or feature's relationship to another element(s) or feature(s) and are meant to be relative to each other and not restricted to any specific range of absolute temperature unless specifically defined. Even if specifically defined, absolute temperatures or temperature ranges are intended to serve as examples.

Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An exhaust system with a semi-closed cycle, comprising:
- a main flow path configured to carry one or more gases, wherein the main flow path has an inlet node, an outlet node, and a recirculation node arranged between the inlet node and the outlet node;
- an exhaust gas recirculation (EGR) flow path coupled to the main flow path and configured to divert, at the recirculation node, a recirculated exhaust gas from the main flow path and recirculate the recirculated exhaust gas to the inlet node;
- an engine arranged on the main flow path downstream from the inlet node, wherein the engine is configured to receive a gas mixture including ambient air and the recirculated exhaust gas, produce an exhaust gas, and output the exhaust gas and the recirculated exhaust gas in an exhaust stream;
- a heat exchanger configured to receive a first portion of the exhaust stream, and transfer heat from the first portion of the exhaust stream to an exchanger fluid, resulting in the exchanger fluid being heated and the first portion of the exhaust stream being cooled to produce a first portion of a cooled exhaust stream; and
- an absorption chiller configured to receive a second portion of the exhaust stream, extract heat from the second portion of the exhaust stream to cool the second portion of the exhaust stream and produce a second portion of the cooled exhaust stream,
- wherein the heat exchanger and the absorption chiller are connected in parallel, and
- wherein an output of the heat exchanger and an output of the absorption chiller are coupled such that the first portion of the cooled exhaust stream and the second portion of the cooled exhaust stream are combined to produce the cooled exhaust stream, wherein the cooled exhaust stream is directed further along the main flow path toward the recirculation node and the outlet node.

2. The exhaust system of claim 1, wherein the absorption chiller is configured to receive a utility fluid, and use the heat extracted from the second portion of the exhaust stream to lower a temperature of the utility fluid to produce a chilled utility fluid.

3. The exhaust system of claim 2, further comprising:
- a carbon capture system coupled to the outlet node and configured to capture a $CO_2$ gas present in the cooled exhaust stream,
- wherein the carbon capture system includes one or more chiller heat exchangers configured to receive the chilled utility fluid, and cool one or more target fluids via a respective thermal exchange with the chilled utility fluid.

4. The exhaust system of claim 1, wherein the heat exchanger and the absorption chiller are connected via manifolds configured to carry respective exhaust streams.

5. The exhaust system of claim 1, further comprising:
- an EGR fan arranged on the EGR flow path and configured to regulate a flowrate of the recirculated exhaust gas to the main flow path based on a gas concentration of a target gas in the main flow path, wherein the target gas is an oxygen gas or a $CO_2$ gas; and
- a filtration unit arranged on the EGR flow path between the EGR fan and the inlet node, wherein the filtration unit includes hydrophobic filter elements that are configured to remove entrained water and solid particulates from the recirculated exhaust gas.

6. The exhaust system of claim 5, further comprising:

a condenser arranged on the EGR flow path between the EGR fan and the filtration unit, wherein the condenser is configured to condense the recirculated exhaust gas such that the recirculated exhaust gas is cooled and such that water is removed from the recirculated exhaust gas.

7. The exhaust system of claim 1, further comprising:

a direct contact cooler (DCC) arranged on the main flow path downstream from the heat exchanger and the absorption chiller for receiving the cooled exhaust stream, wherein the DCC is arranged upstream from the recirculation node and the outlet node, and wherein the DCC is configured to quench the cooled exhaust stream to lower a temperature of the cooled exhaust stream.

8. The exhaust system of claim 7, further comprising:

a condenser arranged on the main flow path downstream from the DCC and upstream from the recirculation node and the outlet node, wherein the condenser is configured to condense the cooled exhaust stream such that the cooled exhaust stream is cooled further and such that water is removed from the cooled exhaust stream.

9. The exhaust system of claim 8, wherein the absorption chiller is configured to receive a utility fluid, and use the heat extracted from the second portion of the exhaust stream to lower a temperature of the utility fluid to produce a chilled utility fluid, wherein the condenser is configured to receive the chilled utility fluid, and condense the cooled exhaust stream via a respective thermal exchange with the chilled utility fluid, and wherein the condenser is configured to provide the water to the DCC for quenching the cooled exhaust stream.

10. The exhaust system of claim 8, further comprising:

a dehydration vessel arranged on the main flow path downstream from the condenser and upstream from the recirculation node and the outlet node, wherein the dehydration vessel is configured to remove additional water from the cooled exhaust stream.

11. The exhaust system of claim 10, wherein the dehydration vessel is configured to dehydrate the cooled exhaust stream to reduce a risk of icing at the engine.

12. The exhaust system of claim 7, further comprising:

a dehydration vessel arranged on the main flow path downstream from the DCC and upstream from the recirculation node and the outlet node, wherein the dehydration vessel is configured to remove water from the cooled exhaust stream.

13. The exhaust system of claim 1, further comprising:

a cooler arranged upstream from the inlet node, wherein the cooler is configured to cool the ambient air prior to providing the ambient air to the inlet node.

14. The exhaust system of claim 1, wherein a temperature of the recirculated exhaust gas, derived from the cooled exhaust stream, is lower than a temperature of the ambient air.

15. The exhaust system of claim 1, wherein a temperature and a moisture content of the recirculated exhaust gas, derived from the cooled exhaust stream, enable the engine to produce an output power that meets or exceeds international organization for standardization (ISO) conditions irrespective of a temperature of the ambient air.

16. The exhaust system of claim 15, wherein the ISO conditions are 59° Fahrenheit (F) ambient temperature, 14.7 pounds per square inch (PSI) atmospheric pressure, and 60% relative humidity, and wherein the temperature and a $CO_2$ concentration of the recirculated exhaust gas are configured to maintain a density of the gas mixture at a level sufficient for the engine to produce the output power that meets or exceeds the ISO conditions irrespective of the temperature of the ambient air.

17. The exhaust system of claim 1, wherein the recirculated exhaust gas is configured to increase a density of the gas mixture, enabling the engine to burn a higher quantity of fuel, generate a higher amount of power, and lower a net heat rate consumed by the engine.

18. An exhaust system with a semi-closed cycle, comprising:

a main flow path configured to carry one or more gases, wherein the main flow path has an inlet node, an outlet node, and a recirculation node arranged between the inlet node and the outlet node;

an exhaust gas recirculation (EGR) flow path coupled to the main flow path and configured to divert, at the recirculation node, a recirculated exhaust gas from the main flow path and recirculate the recirculated exhaust gas to the inlet node;

an engine arranged on the main flow path downstream from the inlet node, wherein the engine is configured to receive a gas mixture including ambient air and the recirculated exhaust gas, produce an exhaust gas, and output the exhaust gas and the recirculated exhaust gas in an exhaust stream;

a direct contact cooler (DCC) arranged on the main flow path downstream from the engine, for receiving the exhaust stream, and upstream from the recirculation node and the outlet node, wherein the DCC is configured to quench the exhaust stream to lower a temperature of the exhaust stream; and a condenser arranged on the main flow path downstream from the DCC and upstream from the recirculation node and the outlet node, wherein the condenser is configured to condense the exhaust stream such that the exhaust stream is cooled further and such that water is removed from the exhaust stream.

19. The exhaust system of claim 18, wherein the condenser is configured to provide the water to the DCC for quenching the exhaust stream.

20. An exhaust system with a semi-closed cycle, comprising:

a main flow path configured to carry one or more gases, wherein the main flow path has an inlet node, an outlet node, and a recirculation node arranged between the inlet node and the outlet node;

an exhaust gas recirculation (EGR) flow path coupled to the main flow path and configured to divert, at the recirculation node, a recirculated exhaust gas from the main flow path and recirculate the recirculated exhaust gas to the inlet node;

an engine arranged on the main flow path downstream from the inlet node, wherein the engine is configured to receive a gas mixture including ambient air and the recirculated exhaust gas, produce an exhaust gas, and output the exhaust gas and the recirculated exhaust gas in an exhaust stream;

an EGR fan arranged on the EGR flow path and configured to regulate a flowrate of the recirculated exhaust gas to the main flow path based on a gas concentration of a target gas in the main flow path, wherein the target gas is an oxygen gas or a $CO_2$ gas;

a filtration unit arranged on the EGR flow path between the EGR fan and the inlet node, wherein the filtration unit includes hydrophobic filter elements that are configured to remove entrained water and solid particulates from the recirculated exhaust gas; and a condenser arranged on the EGR flow path between the EGR fan and the filtration unit, wherein the condenser is configured to condense the recirculated exhaust gas such that the recirculated exhaust gas is cooled and such that water is removed from the recirculated exhaust gas.

* * * * *